Figure 1:
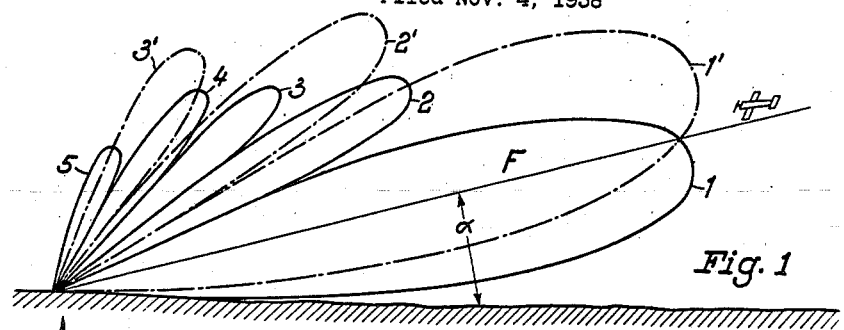

Sept. 29, 1942.  E. KRAMAR  2,297,228

GLIDE PATH PRODUCING MEANS

Filed Nov. 4, 1938

Inventor:
Ernst Kramar
by E. D. Phinney
Att'y

Patented Sept. 29, 1942

2,297,228

UNITED STATES PATENT OFFICE 2,297,228

GLIDE PATH PRODUCING MEANS

Ernst Kramar, Berlin, Germany; vested in the Alien Property Custodian

Application November 4, 1938, Serial No. 238,830
In Germany November 4, 1937

1 Claim. (Cl. 250—11)

The present invention relates to radio direction finding systems, and more specifically to methods of and means for producing glide paths for landing aircraft.

Several methods of producing a slip-way or glide path for landing aeroplanes are known in the art according to which a radio transmitter is caused to emit a club-shaped bundle of rays at an angle to the earth's surface. An aeroplane flying toward such radio beacon transmitter is then guided to the landing ground by means of a radiation plane of equal field intensity. However, gliding paths produced in accordance with this principle involve the disadvantage of having too great a steepness at high altitudes and too flat a curve in the vicinity of the ground surface, from which follows that the pilot is caused to start the landing operation at a very steep angle to earth and to approach the ground surface almost in parallel therewith, so that the speed on touching the landing ground is so high that security is jeopardized.

In order to overcome this disadvantage, attempts have been made to render plane or at least substantially plane the glide path which forms an acute angle with the earth's surface. Consequently, instead of using a single radiation field of constant field intensity, methods of landing aircraft have been proposed according to which the landing is effected by the comparison between the field intensities of two differently directed or differently formed antenna fields. This field intensity comparison may be accomplished in such a manner that different vertical radiation patterns of antenna fields are alternately keyed as complementary signals, that is, as dashes and dots or in accordance with the A—N ryhthm, the signals of one kind, such as dots, being rendered effective during the ineffectiveness of another kind of signals, such as dashes, for example. The glide path to be followed is then given to the pilot either as an audible continuous dash tone, or as an optical instrument indication operating on any well known principle.

The actual use of such glide path requires a given angular relation between the corresponding plane of radiation and the earth's surface. Assuming that an airplane flies at a height of 200 meters above ground and commences the landing 3,000 meters in front of the landing ground, the angle between the glide path and the earth's surface amounts to approximately 3 degrees. However, a slip-way radiation plane forming such an acute angle with ground requires two antenna fields having such different direction characteristics that they intersect each other at a relatively acute angle, this being the sole feasible way for securing the necessary accuracy in indications with respect to a departure from the gliding path in a vertical direction, that is, upwards or downwards. The possibility for obtaining two such different antenna fields by means of any known directional system, for instance, would inevitably require a ray bundle of utmost sharpness which, in turn, would demand very extended dimensions of the antenna system. Glide paths produced by means of directional antennae are thus useful in ultra short wave operation only, that is, with wavelengths equal to fractions of a meter, since it would otherwise be impossible to attain the corresponding sharpness of the bundle by means of an antenna system of adequate dimensions.

The present invention proposes a new method of producing glide paths in accordance with the principle of field intensity comparison between two radiation patterns. This new method can be effected by a very simple antenna system without introducing the heretofore mentioned disadvantages. The invention makes use of the known effect occurring when the space between the earth's surface and an antenna system is a multiple of the operating wavelength. Investigations have proven that, in contradiction to the single club-shaped directional diagram produced by the first mentioned known methods, an antenna field consisting of a plurality of club-shaped leaves or lobes is obtained according to the last mentioned effect as a result of the interference between the direct antenna radiation and its radiation being reflected at the ground's surface. The antenna characteristic thus comprises several maxima and minima, the number, the shape and the dimensions of which depend upon the distance at which the antenna system is spaced from the earth's surface.

Figure 2:
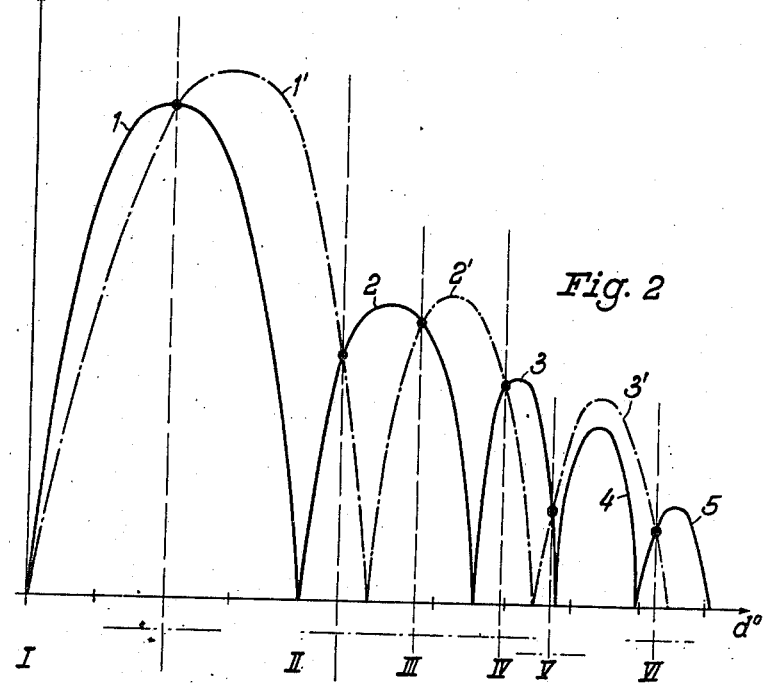
Figure 3:
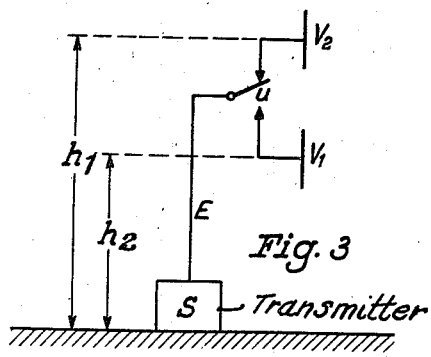
Figure 4:
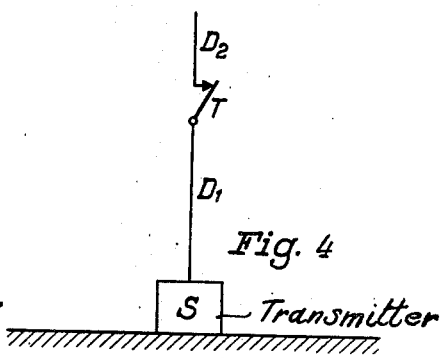

The invention will be more readily understood from the following description taken in conjunction with the accompanying drawing, in which Fig. 1 shows a combined radiation diagram obtained according to the invention, Fig. 2 is a modified illustration of the diagram shown in Fig. 1, Fig. 3 schematically shows a transmitter arrangement for obtaining such diagrams, while Fig. 4 is a modification over the system shown in Fig. 3.

Referring first to Fig. 1, the reference numerals 1, 2, 3, 4 and 5 denote the various leaves or lobes of the antenna diagram and are shown in full lines. The antenna producing this diagram is spaced from the ground at a distance $h1$. The leaves or lobes 1', 2' and 3' which are shown by dash-dotted lines indicate the leaves or lobes produced by a further antenna system which is located at a height $h2$ above the earth's surface. It is possible to attain these directional characteristics with very simple means, such as vertical dipole antennae, for example. The individual leaves or lobes of the diagram differ so from one another with respect to number and shape as to provide acute angles of mutual intersection. For the purpose of producing glide paths in accordance with the principle of field intensity comparison, suitable leaves or lobes of the characteristics may be selected and caused to intersect each other. This relates specifically to the lower leaves or lobes which are preferably well adapted for producing the desired flat slip-way shown at F of Fig. 1.

Several partial surfaces of the individual leaves or lobes of the radiation characteristics produced in accordance with the method now described overlap each other at the same time so that several glide paths are obtained. On flying toward such slip-way beacon, the pilot selects the correct glide path which is generally the lowest of the paths produced. The variety of paths is by no means to be considered at a disadvantage, since the individual paths may be distinguished from one another in a manner which is hereinafter more closely described.

In a slip-way radio beacon system as heretofore described, the lowest leaves or lobes preferably involve the greatest field intensity so as to pronounce the correct glide path. Moreover, the lowest glide path will be the first and the correct path which an airplane will reach on approaching the slip-way radio transmitter in question. The modern systems for landing aircraft generally transmit at a given distance from the landing ground a certain caution signal for indicating to the pilot the position where the landing proceeding is to be commenced. The pilot flies on a straight course until the first caution signal radiation is reached, whereupon he will cause the aeroplane to descend after having ascertained the reading of the barometric height indicator showing a height of 200 meters, for example. In this level the caution signal radiation intersects the landing plane radiation so that the correct glide path is immediately determined by the pilot. The other radiation planes of equal field intensity are considerably steeper and an aeroplane is able to cross such planes in very great heights only.

A further possibility for distinguishing the different radiation planes of equal field intensity is shown in Fig. 2 in which the field intensities of the individual radiation leaves or lobes are plotted in right angle coordinates relative to the angle α which the respective glide path forms with the earth's surface. The leaves shown in full lines are produced by one antenna system while the leaves or lobes indicated by dash-dotted lines are emitted by a second antenna system. For instance, the Morse signal N (— ·) is allotted to the full line leaves 1, 2, 3, 4 and 5 and the complementary Morse signal A (· —) is allotted to the leaves 1', 2' and 3' shown in dash-dotted lines. It will readily be seen from this representation that several direction finding planes I to IV are produced. On the following the correct glide path or plane I, the Morse signal N (— ·) predominates at a downwards deviation from this plane, while the Morse signal A (· —) is predominant when the airplane deviates upwards from the glide path. The predominant Morse signals are indicated below the abscissa of this diagram. With reference to the second plane II which may be considered as an interference glide path, the opposite condition prevails since in this case a predominant Morse signal A (· —) indicates a downwards and a predominant Morse signal N (— ·) indicates an upwards deviation from the glide path in question. Therefore, the signal which predominates in response to an upwards or downwards departure from such glide path immediately indicates to the pilot whether the correct path was found or not. Similar conditions exist when optical indication instruments are used on the vehicle, since in this case the pointer would indicate "too high" on steering the airplane downwards, and "too low" on steering the airplane upwards with respect to the glide path. The next guiding plane III, in turn, presents the same deviation characteristic as the heretofore described glide path I, but this path and the succeeding paths exist in so great heights over the ground that they are practically insignificant. It will also be observed from Fig. 2 that the two leaves or lobes 4 and 3' are so chosen with respect to shape, position and size that they do not intersect each other. It is thus obvious that the transmitter system may be so arranged that merely one single glide path is produced, while the other leaves or lobes of the antenna characteristics may be so dimensioned with respect to one another that no planes of intersection are produced.

The Figs. 3 and 4 show suitable arrangements which are well adapted for realizing the method heretofore described. The transmitter arrangement according to Fig. 3 comprises two vertical antennae V1 and V2 which are differently spaced from the ground, that is, the antenna V1 at a height $h2$ and the antenna V2 at a height $h1$ above the earth's surface. Differently shaped antenna diagrams are produced when the transmitter S energizes either the antennae V1 or V2. The feeder line E from the transmitter S is alternately connected to either of the antennae in accordance with a given rhythm by means of a make-and-break device U.

A similar effect is obtained by the system shown in Fig. 4 which is a simplified modification over the system shown in Fig. 3. The desired leaves or lobes may also be produced by causing a long vertical wire to oscillate at several wavelengths. The shape of the leaves or lobes depends upon the number of wavelengths on the vertical wire, that is, on the lengths of the wire. Means are therefore provided in order to prolong the antenna wire D1 by an additional antenna length D2 and this prolongation is accomplished by means of a key switch T. The antenna length D2 is connected to and disconnected from the antenna wire D1 in the rhythm of complementary signals.

What is claimed is:

A radio transmitting arrangement for producing glide paths by field intensity comparison consisting essentially of a first radiation means spaced above the earth at a height in the order of a multiple of the operating wavelength for producing a multi-lobe vertical radiation diagram the lobes having a predetermined angular relation with respect to the earth, a second radiation means spaced above the earth a distance different from said first radiation means at a height in the order of a multiple of the operating wavelength for producing a second multi-lobe vertical radiation diagram the lobes thereof having a different predetermined angular relation with respect to the earth and intersecting the lobes of said first mentioned diagram, a transmitter, and means interconnecting said transmitter and said radiation means for alternately rendering said first and said second means effective.

ERNST KRAMAR.